(12) United States Patent
Andrews et al.

(10) Patent No.: US 6,821,660 B2
(45) Date of Patent: Nov. 23, 2004

(54) GAS HUMIDIFICATION DEVICE FOR OPERATION, TESTING, AND EVALUATION OF FUEL CELLS

(75) Inventors: Craig Andrews, College Station, TX (US); Mark J. Flusche, Bryan, TX (US); Donald P. Lyons, College Station, TX (US)

(73) Assignee: Fideris, Inc., College Station, TX (US)

( * ) Notice: Subject to any disclaimer, the term of this patent is extended or adjusted under 35 U.S.C. 154(b) by 298 days.

(21) Appl. No.: 09/993,401

(22) Filed: Nov. 14, 2001

(65) Prior Publication Data

US 2002/0110714 A1 Aug. 15, 2002

Related U.S. Application Data

(63) Continuation-in-part of application No. 09/392,060, filed on Sep. 8, 1999, now Pat. No. 6,383,671.
(60) Provisional application No. 60/099,465, filed on Sep. 8, 1998.

(51) Int. Cl.[7] .............................................. H01M 8/04
(52) U.S. Cl. .............................. 429/13; 429/22; 429/23; 429/24; 429/25; 429/26
(58) Field of Search .......................... 429/22, 23, 24, 429/25, 26, 13

(56) References Cited

U.S. PATENT DOCUMENTS

| | | | |
|---|---|---|---|
| 2,239,595 A | 4/1941 | Cummings et al. | 261/141 X |
| 3,659,604 A | 5/1972 | Melville et al. | 261/152 X |
| 3,801,077 A | 4/1974 | Pearson | 261/139 |
| 4,276,244 A | 6/1981 | Gyorgy et al. | 261/139 |
| 4,769,297 A | 9/1988 | Reiser | 429/17 |
| 4,826,742 A | 5/1989 | Reiser | 429/33 |
| 4,911,866 A | 3/1990 | Monroe | 261/81 |
| 5,009,967 A | 4/1991 | Scheffler | 429/24 X |
| 5,139,344 A | 8/1992 | Mutter | 374/28 |
| 5,242,764 A | 9/1993 | Dhar | 429/30 |
| 5,262,250 A | 11/1993 | Watanabe | 429/33 |
| 5,318,863 A | 6/1994 | Dhar | 429/30 |
| 5,330,626 A | 7/1994 | Banerjee | 204/157.15 |
| 5,368,786 A | 11/1994 | Dinauer | 261/130 |
| 5,382,478 A * | 1/1995 | Chow et al. | 429/26 |
| 5,403,675 A | 4/1995 | Ogata | 429/33 |
| 5,432,020 A | 7/1995 | Fleck | 429/13 |

(List continued on next page.)

FOREIGN PATENT DOCUMENTS

| | | | | |
|---|---|---|---|---|
| DE | 0 629 013 A2 | 5/1994 | | H01M/8/04 |
| DE | 198217661 C1 | 6/1999 | | H01M/8/04 |
| JP | 05 036428 A | 2/1993 | | H01M/8/04 |
| JP | 07 263010 A | 10/1995 | | H01M/8/04 |

OTHER PUBLICATIONS

Gang Xie, Water Transport Behavior in Nafion 117, 1995, J Electrochem Society Bol. 142, No. 9 pp. 3057–3062, (Sep).
D.P. Wilkinson, Water management and stack design for solid polymer fuel cells, 1994, Journal of Power Sources pp. 117–127, month unknown.
International Search Report PCT/US02/36524 (mailed Nov. 2002).

*Primary Examiner*—Stephen J. Kalafut
(74) *Attorney, Agent, or Firm*—Streets & Steele; Jeffrey L. Streets; Steven L. Christian

(57) ABSTRACT

A method and apparatus for the humidification of gas streams, such as reactant gas streams for fuel cells, wherein the specific water evaporation rate, gas delivery temperature, and degree of gas humidity may be adjusted and maintained at predetermined levels. An ultrasonic device providing a water mist is used in the evaporation process. The amount of water vapor being introduced into the gas stream can be varied up to the saturation point of the reactant gas stream. As the water vapor leaves the evaporation chamber, it mixes with the gas stream in a gas humidification chamber or riser. The humidified reactant gas stream is then maintained at a set point temperature that is at least above the dew point temperature of the humidified reactant gas.

16 Claims, 4 Drawing Sheets

U.S. PATENT DOCUMENTS

| | | | |
|---|---|---|---|
| 5,434,016 A | 7/1995 | Benz et al. | 429/13 |
| 5,512,831 A | 4/1996 | Cisar | 324/426 |
| 5,547,551 A | 8/1996 | Bahar | 204/296 |
| 5,635,039 A | 6/1997 | Cisar | 204/252 |
| 5,679,482 A | 10/1997 | Ehrenberg | 429/249 |
| 5,786,104 A | 7/1998 | Black | 429/13 |
| 5,952,119 A | 9/1999 | Wilson | 429/34 |
| 5,965,288 A | 10/1999 | Okamoto | 429/26 |
| 6,294,277 B1 * | 9/2001 | Ueno et al. | 429/22 |
| 6,350,535 B1 | 2/2002 | Kralick | 429/13 |
| 6,350,536 B1 * | 2/2002 | Ban et al. | 429/22 X |
| 6,383,671 B1 | 5/2002 | Andrews et al. | 429/24 |
| 6,576,357 B1 | 6/2003 | Helmolt | 429/13 |
| 6,689,500 B2 * | 2/2004 | Nelson | 429/26 |
| 2002/0015867 A1 | 2/2002 | Cargnelli et al. | |

* cited by examiner

GAS HUMIDIFICATION DEVICE FOR OPERATION, TESTING, AND EVALUATION OF FUEL CELLS

This application is a continuation-in-part of U.S. application Ser. No. 09/392,060 filed on Sep. 8, 1999, now U.S. Pat. No. 6,383,671, which claimed the benefit of U.S. provisional application Ser. No. 60/099,465 filed on Sep. 8, 1998.

FIELD OF THE INVENTION

This invention relates to the controlled humidification of gases used by devices requiring or benefiting from external gas humidification for operation. More particularly, the invention relates to controlling the temperature and humidity of fuel and oxidant gases being provided to a fuel cell under testing conditions.

BACKGROUND OF THE INVENTION

Humidification of the fuel gas, oxidant gas or both the fuel and oxidant gases is generally required for fuel cells that use solid polymer electrolyte membranes. Proton exchange membrane (PEM) fuel cells require water to support proton conduction through the membrane. While water is a product of fuel cell reactions involving hydrogen or methanol as a fuel and oxygen or air as an oxidant, the amount of water formed is often inadequate to maintain membrane hydration.

One reason for the lack of sufficient hydration of proton exchange membranes in fuel cells is that the water is formed at the electrode where the oxidant is consumed and water is carried away by electroosmosis from the fuel consuming electrode. A significant amount of the water produced in the fuel cell reaction is removed from the fuel cell (either as water vapor or liquid water) by the flowing, heated oxidant gas stream, typically air. During operation of a PEM fuel cell, water is continually transported across the proton exchange membrane from the fuel consuming electrode to the oxidant consuming electrode due to electroosmosis.

While the product water formed may maintain sufficient humidification of proton exchange membranes at low and intermediate current density conditions, the membrane can dry out and experience increases in its internal resistance at high current density conditions. The problem of the membrane drying out has typically been addressed by adding water, usually as water vapor, to the gas stream containing the fuel, or to both gas streams (fuel and oxidizer). It also should be noted that the performance of the fuel cell decreases if the catalyst layer is flooded with liquid water either from excess water vapor being delivered to the fuel cell or the lack of a means of removing sufficient product water.

Various methods of introducing water directly in the fuel cell have been developed. U.S. Pat. No. 5,262,250 (Watanabe) teaches the use of narrow paths or wicks within the proton exchange membrane for maintaining hydration of the membrane in a fuel cell stack. However, a PEM with wicks is difficult to manufacture, requires increased manifold requirements for the cell frames, requires generation and delivery of water to the paths, presents difficulties in delivering the water uniformly across the surface of the membrane, and the amount of flow of liquid water that can be achieved through the membrane is limited and uncontrolled. In addition, the wicks rely on wetting to promote fluid flow.

Another method that is commonly used is to humidify a reactant gas inside the cell assembly, or stack, itself. This is usually done with a membrane humidifier. In this type of humidifier, a stream of liquid water is located on one side of a water permeable membrane while the reactant gas stream flows on the other side. This method uses the heat of the fuel cell itself to evaporate the water. This eliminates the need for separate heaters to humidify the reactant gas streams, but it limits the humidification of the gas streams to a dew point that is essentially the same as the cell operating temperature. It also adds to the size of the cell stack. Since the humidifier is a structural part of the stack, it has to be built to serve as a supporting member. This can increase the weight and size of the system by a greater amount than is required for an external humidification system.

Another method for humidifying a PEM is to inject liquid water directly into either the manifold of the cell (or stack), or a reactant gas line leading to the manifold. The liquid water is injected in such a manner as to form a mist in the reactant gas line. As the reactant gas stream is heated by the cell, the water quickly evaporates due to the high surface area resulting from small droplet sizes. This type of humidifier produces a very compact humidification system. The amount of water vapor in the reactant gas stream can easily be controlled by metering the liquid water into the cell. While this can be a good system for stacks in the kilowatt range and larger, it is not an effective system for smaller fuel cell systems. The weak point of water injection methods is the difficulty encountered in forming a steady and consistent mist at low liquid water flow rates. For instance, a nominally 1 kW stack consisting of six cells, each at 0.6 V, operating at 85° C. with both the fuel and air streams humidified, requires about 10.3 grams of water per minute to humidify its air stream, assuming a 2:1 air to current stoichiometry (meaning two times the theoretical amount of air needed) at 30 psig. This amount is easily metered on a consistent basis. A smaller stack, generating 300 W at 70° C. requires only 1.50 grams of water per minute under the same feed conditions. This flow rate of water can be metered, but the higher precision required to maintain a smooth flow at the lower feed rate results in the smaller stack actually requiring a more complex humidifier. In the case of a small single cell operating at 30 W, and the same operating conditions as above, the feed rate drops to 0.150 grams of water per minute for the air stream and even less for the fuel gas stream. At these rates, maintaining a steady flow rate of water is extremely difficult.

The simplest way to humidify a reactant gas stream is to pass the gas as a stream of fine bubbles through a column of liquid water. As long as the gas has sufficient contact time with the water, the amount of water vapor in the reactant gas stream can be controlled by controlling the temperature of the liquid water. This method works well at low gas flows. To fully saturate the reactant gas with water vapor requires either small bubbles, ideally under 0.5 mm in diameter, or a tall column to allow enough contact time to ensure complete saturation. Operating the humidifier under conditions in which the reactant gas does not have sufficient contact time to become fully saturated and, as a result, is carrying a varying amount of water vapor leads to unrepeatable operation, reduced performance, and possibly damage to the fuel cell. For example, if a contact time of 0.5 seconds is required to saturate the reactant gas bubbles with water, the column will need to be at least 19 cm tall (based on Stokes law velocity of 38.2 cm/sec for a 0.5 mm bubble of air in water at 80° C.). For a flow rate of one liter of reactant gas per minute forming 0.5 mm bubbles with an average spacing of 0.5 mm, a liquid water volume of over 300 cm$^3$ is required, with a similar or greater volume for the reverse portion of the convective flow produced by the reactant gas lifting the liquid water. Additional volume is required for the disperser to form the bubbles and for a reserve of liquid water to replenish that lost to evaporation. The resulting humidifier has a volume of over one liter, and any increase in reactant gas flow will require an even larger volume.

U.S. Pat. No. 5,512,831 to Cisar teaches an internal humidification device that uses an external humidifier system and a water permeable membrane. A set of parallel water permeable tubes are used to controllably humidify a reactant gas fed to a fuel cell. The humidity is controlled by controlling the temperature at which the humidification occurs and/or by controlling the reactant gas flow rate through the system. The humidification capacity of the system is limited by the amount of liquid water that can pass through the walls of the water permeable membrane tubes. The water transfer rate is varied by adjusting the water temperature and the gas flow rate. However, the reactant gas flow rate is generally set at the rate required to operate the fuel cell under specified conditions, leaving the liquid water temperature as the only variable means of increasing or decreasing the humidification level. Due to the thermal mass of the system and the volume of water in contact with the membrane, rapid increases of the liquid water temperature are difficult to achieve, and decreasing the water temperature requires a water cooling system. The total quantity of water entrained in the reactant feed gas and the rate of water transfer are unknown and must be approximated based on other operating conditions.

U.S. Pat. No. 5,368,786 (Dinauer) teaches a humidification method using porous stainless steel tubes. The porous stainless steel tube system experiences the same limitations inherent to the membrane tube system, and may allow free reactant gas passage through the porous steel tubes if a system upset occurs and the liquid water level or water pressure within the tubes is not maintained at its proper value.

Thus, there remains a need for an improved gas humidification system and method for use with fuel cells. It would be desirable if the humidification system could form part of a stable system for testing, evaluating and utilizing fuel cells over a wide range of operating conditions and reactant gas flow rates that provides real-time, accurate control of the quantity of water delivered to the fuel cell.

SUMMARY OF THE INVENTION

The present invention provides an apparatus and method for controlling the temperature and humidity of a gas stream such as, for example, a reactant gas stream and a fuel gas stream used in fuel cells. The apparatus comprises an evaporator chamber having a water inlet flow controller, an ultrasonic mister and one or more ports for the delivery of water vapor and the return of condensate; and a gas humidifying chamber in fluid communication with the one or more ports of the evaporator chamber, the gas humidifying chamber having a gas inlet, elements arranged in the gas humidifying chamber to return condensate to at least one of the one or more evaporator chamber ports and a humidified gas outlet. The apparatus further comprises one or more heaters for heating the gas disposed at locations selected from between the humidification chamber and the evaporation chamber, before the gas inlet, after the gas outlet, or combinations thereof. Each of the heaters are controlled to a setpoint temperature by individual temperature controllers having one or more temperature sensors disposed at each heater outlet.

The elements arranged in the humidification chamber are selected from a demister pad, baffles, perforated baffles, trays, packing or combinations thereof. A controller that controls a device selected from a control valve and a metering pump controls the water level in the evaporator chamber. The one or more evaporator chamber ports have sufficiently small openings to substantially prevent passage of the gas into the evaporator chamber during use.

The apparatus further comprises a humidistat, wherein the humidistat provides feedback to a humidification controller having an output to an oscillator. The ultrasonic mister comprises a transducer having a metal disk that vibrates in response to an electrical signal from the oscillator, wherein the transducer is submerged in the evaporator chamber, and wherein the vibration produces minute droplets of water. The apparatus further comprises water vapor conveyance means selected from piping or tubing; side ports in the humidifying chamber in fluid communication with the evaporator chamber; wherein the conveyance means delivers water vapor from the one or more ports of the evaporation chamber to the humidifying chamber side ports.

As another embodiment of the present invention, the apparatus comprises an evaporator chamber having an inlet flow controller, a heater and a port for delivery of water vapor and the return of condensate; a gas humidifying chamber in fluid communication with the evaporator chamber port, the gas humidifying chamber having a gas inlet, elements arranged in the gas humidifying chamber to return condensate to the evaporator chamber port and a humidified gas outlet; and additional heaters disposed at locations selected from between the humidification chamber and the evaporation chamber, before the gas inlet, after the gas outlet, or combinations thereof.

In yet another embodiment, the present invention presents an apparatus comprising an evaporator chamber having a water inlet flow controller and an ultrasonic mister; and a gas humidifying chamber disposed above the evaporator chamber, the gas humidifying chamber having a gas inlet, elements arranged in the gas humidifying chamber to return condensate to the evaporator chamber and a humidified gas outlet, wherein the evaporator chamber and the gas humidifying chamber are within a common vessel. One or more heaters for heating the gas may be disposed at locations selected from before the gas inlet, after the gas outlet, or combinations thereof. The apparatus further comprises a humidistat, wherein the humidistat provides feedback to a humidification controller having an output to an oscillator. The ultrasonic mister comprises a transducer having a metal disk that vibrates in response to an electrical signal from the oscillator, wherein the transducer is submerged in the evaporator chamber, and wherein the vibration produces minute droplets of water.

BRIEF DESCRIPTION OF THE DRAWINGS

So that the above recited features and advantages of the present invention can be understood in detail, a more particular description of the invention, briefly summarized above, may be had by reference to the embodiments thereof, which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1:
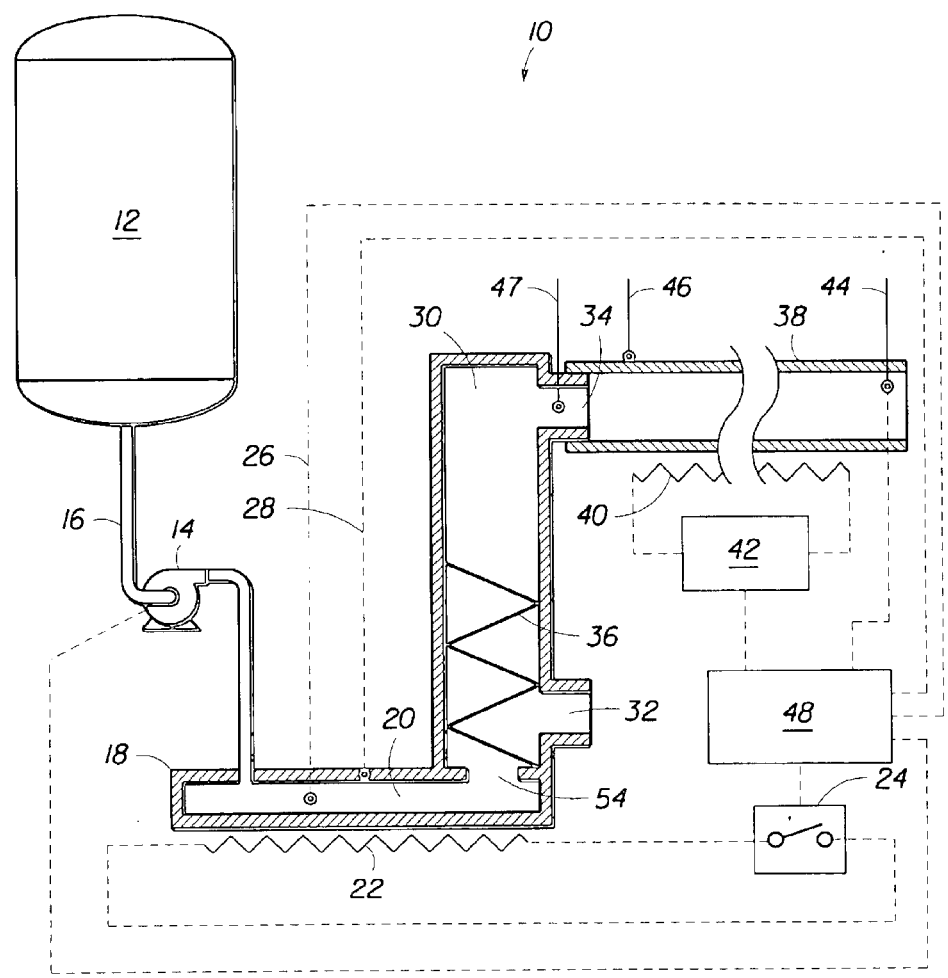
FIG. 1 is a schematic cross-sectional view of one embodiment of a gas humidification apparatus of the present invention.

The present invention relates to an apparatus used for the humidification of gas streams. More specifically, the invention relates to an apparatus where the specific water evaporation rate, gas delivery temperature, and degree of gas humidity may be adjusted and maintained at predetermined levels. While the invention is described in greatest detail below in reference to the humidification of reactant and fuel gas streams for use in fuel cells, the invention will be useful in many other applications requiring controlled humidification of a gas stream, which uses and applications are included within the scope of the present invention. Specific application of a humidification system to the testing of fuel cells is described in U.S. Pat. No. 5,512,831, which is incorporated by reference herein.

One aspect of the present invention provides a gas humidification apparatus that provides a predetermined amount of water vapor to a reactant gas stream at a controlled temperature. The amount of water vapor available for absorption by the gas stream can be varied up to the saturation point of the reactant gas stream. The humidified reactant gas stream is then maintained at a set point temperature that is at least above the dew point temperature of the humidified reactant gas. As an alternate means of providing dew point control, the apparatus may further include a cooling heat exchanger to lower the temperature of the reactant gas, in effect approaching the desired dew point from an initial condition having a higher dew point. This temperature reduction will cause surplus water held by the reactant gas to condense, resulting in a lower dew point than the initial reactant gas. This apparatus controls the dew point of the reactant gas by first overheating and saturating the reactant gas and then providing a condensing surface at the desired dew point. The dew point of the reactant gas is ultimately controlled by the temperature of this condensing surface, which is easily provided by a cooling medium such as air or re-circulated water. The apparatus preferably has a control unit allowing the apparatus to be operated manually, automatically, or as a sub-system in a large-scale system. The humidification apparatus is well suited for use in testing the operation of a fuel cell under various well-controlled conditions in order to evaluate the performance of the fuel cell. More particularly, the humidity of the gas stream may be varied, controlled and optimized while measuring the effect of a change in the gas humidity on one or more parameters selected from the group consisting of humidified reactant gas dew point temperature, humidified reactant gas pressure, applied load, fuel cell voltage, fuel cell stack voltage, the extent of membrane hydration and combinations thereof. Each of these parameters may be measured or determined by methods or instruments well known in the art.

The apparatus for humidifying the gas stream has a water evaporation chamber that may include any means of evaporating the water, including isothermal and adiabatic systems. There are basically two categories of humidifiers: isothermal and adiabatic. Isothermal systems use electricity, steam, hot water, natural gas or other fuels as an external heat source to change water to steam. The steam is then added into the gas stream for humidification. This category includes, for example, electric immersion, electrode canister, steam-to-steam, and evaporation humidifiers. Adiabatic humidifiers use mechanical energy to generate a fog or mist of water particles that are injected into the gas stream. They use less energy than isothermal humidifiers because they do not boil the water or lose hot water down the drain when flushing the reservoir. With adiabatic humidifiers, the water droplets absorb heat from the gas stream causing them to evaporate and somewhat cool the gas stream. This cooling may be eliminated from a reactant gas humidifier, if desired, by using gas heaters, electric heaters, or other heating means known in the art to add heat to the gas before, during, or after the humidification step. Adiabatic humidifiers include misters and sprayers, atomizers, foggers, quartz lamp and piezo disk or ultrasonic humidifiers or misters.

Ultrasonic humidifiers employ a low power electronic circuit that consists of an oscillator and an electro-acoustic power converter, or transducer (piezo disk), to convert the electric energy to mechanical energy. The oscillator is mounted on a circuit board in the humidifier control unit and the transducers are immersed in the reservoir of preferably mineral-free water. A metal disk in the transducer vibrates in response to an electrical signal from the oscillator. To increase the amount of water needed for hydration, a control signal to the oscillator will increase the oscillation and thereby increase the vibration of the transducer. At higher frequencies, the inertial effects of the water keep it from oscillating as fast as the transducer creating areas of momentary vacuum and compression. This compression is directed at the surface of the water where cavitation occurs, broken capillary waves are formed, and minute droplets break the surface tension of the water and quickly dissipate above the surface forming a fog or mist. The droplets in the mist are typically 1 micron in diameter. The mist absorbs heat from the surrounding gas stream, causing the water droplets to evaporate and raising the humidity of the gas stream. In one embodiment of the invention, a level controller may control the makeup water flow rate to a reservoir in which the transducers are immersed. Another controller may then control the humidification of the supply stream by increasing or decreasing the frequency of the oscillator in response to feedback from a humidistat installed in the supply stream.

Of the two types of humidification units, heating is the most preferred for maintaining a significant vaporization rate. The evaporation chamber is preferably heated by external means, such as electric cartridge heaters, natural gas, or any other similar heat source. The size, type, and quantity of heaters are chosen such that the desired amount of water may be evaporated at the desired rate. The evaporator temperature may be maintained well above the boiling point of water in order to provide the required amount of water vapor. Specifically, the evaporator may form a plate or other element for flash vaporization of water.

After evaporation, the water vapor may optionally be further heated to the desired temperature before contacting the gas either by heat exchangers, the evaporation chamber, or a dedicated heat chamber. The heating means may be controlled by the control unit to adjust the amount of heat applied to the evaporator to meet the demand for water vapor. Preferably, the evaporator has a first temperature sensor on the outer surface of the evaporation chamber as well as a second temperature sensor on the interior of the evaporation chamber, both of which are connected to the control means.

As the water vapor leaves the evaporation chamber, it mixes with the gas stream in a gas humidification vessel or chamber, also referred to as a gas riser. The gas riser has a water vapor inlet, a gas inlet, and a humidified gas outlet. The gas riser preferably has a baffle, trays or packing disposed therein to attract any water that may have condensed in the gas stream. The baffle directs the condensed liquid water toward the evaporation chamber so the water may be evaporated once again. Alternatively, the condensate may be removed from the evaporation chamber or from the gas riser. This condensate may be quantified and may be later returned to the evaporator or to a water storage reservoir. The preferred baffle is a perforated stainless steel sheet angling back and forth across the cross-section of the riser several times in the base of the riser. This baffle configuration has been shown to be effective in returning condensate to the evaporator, whereas packing that is too dense may enable the gas flow therethrough to actual lift much of the condensate up and out through the gas riser outlet. An alternate baffle is expanded metal foams made from suitable materials such as stainless steel, nickel, and titanium.

When the gas has been humidified, the humidified gas travels out of the riser to a gas transfer line, where the humidified gas is transferred to a fuel cell or other apparatus. The gas transfer line preferably has at least one temperature sensor and at least one heating means that maintains the humidified gas at a predetermined temperature. Optionally, a heating means, with temperature sensors, may be included before and/or after the transfer line to either replace the heating means on the transfer line itself or to supplement the heat supplied by the heating means on the outlet line itself. Furthermore, a heating means may be included to heat the gas stream before it contacts the water vapor. The heating means may be, for example, a plate exchanger, a tubular exchanger, heat tracing, or any other means known in the art. The temperature sensors and heating means are connected to or in electronic communication with the control means so that they may be manually or automatically adjusted and/or maintained. The humidified gas is then delivered at the desired temperature and humidity level to the device requiring a humidified gas stream.

If the gas is at the same temperature or warmer than the water vapor, the water vapor is swept into the gas riser and the humidified gas enters the gas transfer line. If there is more water vapor than can be entrained in the gas stream, the water vapor will transfer some of its thermal energy to the gas stream resulting in a warmer gas stream and some condensation. The condensate collects on the baffles and is returned to the evaporator where it may again be evaporated and engaged with the gas stream. The baffle helps to prevent insufficient humidification of the gas stream by providing mixing and contact time between the gas and the vapor. The baffle also knocks out entrained water droplets in the gas stream. This self-regulating humidification process continues until the reactant gas stream has been sufficiently heated and is able to carry away the water vapor at the same rate that the water vapor is being generated.

As the water vapor leaves the evaporation chamber and is entrained in the gas stream it is replaced in the evaporation chamber at a rate that defines the overall quantity of water that is to be combined with the gas exiting the humidification apparatus. A metering pump can be used to transfer liquid water at a controlled rate from a water source to the evaporation chamber. This pump is preferably controlled by the controller which monitors and controls the pump transfer rate and the evaporator temperature to maintain the desired evaporation rate. An alternate embodiment may include the use of a liquid flow controller such as a mass flow controller. A suitable liquid mass flow controller is a Coriolis flow meter and controller manufactured by Brooks Instruments (Hatfield, Pa.) under the product line named "Quantim". This instrument may be used with an upstream pressure creating pump or other pressurized source of suitable water. In any configuration, it is possible, that the water evaporation rate selected by the user or controller cannot be achieved by the chosen gas stream, such as when the incoming reactant gas stream is already partially or fully humidified and therefore cannot take up as much water as dry gas under similar conditions. In this case, liquid water will collect within the evaporation chamber and potentially enter the gas riser causing damage to the apparatus and any attached equipment. Therefore, a means of detecting the accumulation of liquid water is positioned within the evaporation chamber. The means of detecting a flooded evaporator may include an electro-mechanical system, such as a float or optical water level sensor. Alternatively, the detection means may include a secondary measurement such as a temperature probe inside the evaporation chamber or attached to the exterior of the evaporator. In the latter case, the controller can determine from the measured temperature if the evaporation chamber contains water.

For example, in an evaporation chamber held at a temperature above the boiling point of water, any accumulation of liquid water in the evaporation chamber will cause the temperature in the chamber opposite the heaters to approach the boiling point of water, while the chamber temperature near the heaters will be higher than the boiling point of water. In this instance, based on temperature readings, the controller can establish that the evaporator is accumulating liquid water.

When a flooded evaporator is detected, the controller can reduce the liquid water transfer rate into the evaporator to prevent further accumulation. Likewise, in the event that the evaporator is dry or has a low water level indicating that additional water vapor may be entrained in the reactant gas stream, the controller may optionally increase the liquid water transfer rate and therefore establish the upper limit of the reactant gas water vapor holding capacity. In either case, the apparatus is able to empirically establish and operate at a point of maximum humidification, if desired, and provide the resulting data to the user.

It may also be useful if the humidification assembly is equipped to determine when the system has exceeded the normal operation mode as a humidifier and has begun to operate in an undesirable boiler mode. The boiler mode may be detected or determined by monitoring the temperature of the gas riser outlet. The controller may be provided with a setpoint temperature that would indicate the boiler mode and the setpoint may be 100° C. or less, where a temperature of 100° C. indicates that the assembly is generating steam. In fact, it is anticipated that the evaporator may be operated in a manner to keep the gas riser outlet temperature in a certain operating range without the need for water level or temperature sensors in the evaporator. The operating range might be any range between ambient temperature around the assembly and 100° C.

It may also be useful to provide a combination of hot steam and cool mist to the gas riser to more accurately control or to more rapidly change the resulting temperature of the reactant gas, gas riser, and associated components. Using a control system having proportional control of the heaters and cool misters, a system capable of heating the reactant gas through the use of hot steam being generated by a boiler or flash evaporator in combination with cool mist being generated by ultrasonic nozzles, droplet generators, pressurized misters, or other sources, can provide enhanced control of the reactant gas humidification and dew point. Alternatively, the steam may be injected directly into the reactant gas stream before the humidification chamber.

Another aspect of the invention is a means for maintaining the temperature of the humidified gas stream exiting the gas riser at a temperature above its dew point temperature to prevent condensation. The apparatus is provided with temperature controlled gas transfer lines between the gas riser discharge or outlet and the point of entry to the fuel cell or other apparatus. The temperature controlled gas transfer lines may consist of an insulating and inert tubing wrapped with a resistive heater, and optionally further wrapped with insulation and a protective sleeve. The temperature of a humidified gas transfer line and of the humidified gas exiting the transfer line is monitored by the controller and these temperatures are used to control the power to the resistive heaters. In this manner, the humidified gas stream may be continuously held above the dew point temperature or a setpoint temperature greater than the dew point temperature until it is delivered to the fuel cell or other apparatus.

Finally, as a safety measure, the humidification apparatus is equipped with gas detectors to monitor the interior of a cabinet surrounding the apparatus, preferably including the gas riser and the fuel cell, and to some extent the ambient air outside the cabinet for dangerous or toxic gases. These gases may include any combination of toxic and combustible gases, such as carbon monoxide and hydrogen. Upon detection, the apparatus will alert the user and initiate a safety shutdown procedure.

FIG. 1 is a schematic diagram of one embodiment of the humidification apparatus 10. A water storage tank 12, metering pump 14, and transfer line 16 are in fluid communication with an evaporator 18. The evaporator 18 includes an evaporation chamber 20 that is heated by one or more heaters 22 that can be controlled by switch 24. The evaporation chamber 20 may contain a thermocouple or other device 26 to detect when liquid water is accumulating in the evaporation chamber 20. An additional thermocouple or device 28 positioned outside the evaporation chamber 20 may also be used to detect for water accumulation in the evaporator. The evaporator 18 is in fluid communication with a gas riser 30 having a gas inlet 32 and humidified gas outlet 34. The gas riser 30 includes an internal baffling structure 36 that allows condensate to travel to the edges of the gas riser 30 and be returned to the evaporation chamber 20. The baffle 36 preferably occupies the lower portion of the gas riser.

A gas transfer line 38 is heated by a heater 40 that can be controlled by switch 42. The temperature of the gas exiting the transfer line 38 is measured by temperature probe 44. An additional temperature probe 46 may be used to monitor the temperature of the transfer line 38 itself. This configuration allows the user to maintain the humidified gas stream at a desired temperature, preferably above the dew point temperature of the gas stream.

The metering pump 14, the evaporator heater 22, the transfer line heater 40, as well as the thermocouples 26, 28, 44, 46, and the switches 24, 42 are connected to or in electronic communication with a controller 48, such as a computer. The controller 48 preferably contains software for running the humidification apparatus 10 according to user defined parameters and/or preset parameters. Operating data from each component of the system can be recorded and compiled for later use in test environments as well as routine applications.

Figure 2:
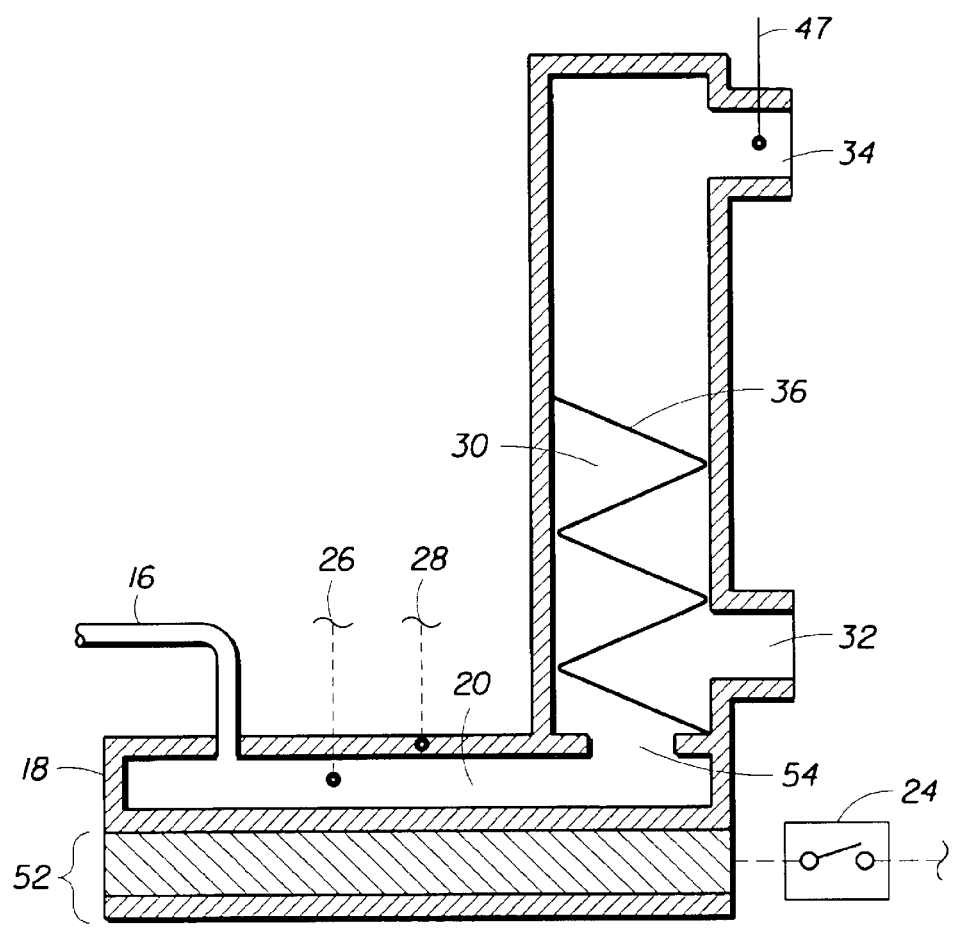
FIG. 2 is a schematic cross-sectional view of another embodiment of the present invention.

FIG. 2 is an enlarged view of the evaporator 18 and gas riser 30 shown in FIG. 1 shown with a different heating means for the evaporator 18. A set of external heaters 52 are in thermal contact with the evaporator 18 and controlled by a switch 24 so that the temperature of the evaporator may be regulated. Temperature probes 26 and 28 are placed such that they represent the temperature of the evaporation chamber 20 and the temperature of the top of the evaporator 18. These temperature probes 26,28 are placed so that they are able to sense the temperature drop of the chamber or external portion of the evaporator when liquid water accumulates in the evaporation chamber 20.

Water vapor leaves the evaporation chamber 20 and enters the gas riser 30 through a restricted opening or evaporation chamber outlet 54. The opening 54 is restricted to prevent a substantial amount of the gas (whether it is a fuel gas, air, oxygen or any other gas) that has entered the gas riser 30 through inlet 32 from entering the evaporation chamber 20. First of all, the restricted opening minimizes contact of the oxidants, etc. with the hot metal surfaces (such as stainless steel, Inconel, etc.) that could suffer oxidation and a shortened lifetime. Secondly, it is generally good to keep fuel gases out of the evaporation chamber since fuels may contain toxic and/or corrosive gases and it is preferred to minimize the volume of these types of gases in the system. While the water being evaporated in the evaporation chamber will tend to oppose and minimize reactant gas flow into the evaporation chamber, the opening is preferably still large enough that liquid water droplets condensing in the gas riser can return to the evaporation chamber for re-evaporation. Accordingly, the present invention accomplishes these objectives with the need of any pumps, control systems, valves or the like.

Unhumidified gas enters the gas riser 30 through port 32 and is engaged with the water vapor or steam inside the riser 30. Within the gas riser 30, the gas is heated by the warm water vapor that may cause some water to condense. This condensate is removed from the gas stream by a low-restriction internal baffle 36 which serve as a surface for condensation and as a means of carrying the condensate from the center of the gas stream to the walls of the reactant gas riser 30 and back to the evaporation chamber 20 where it is re-evaporated.

Figure 3:
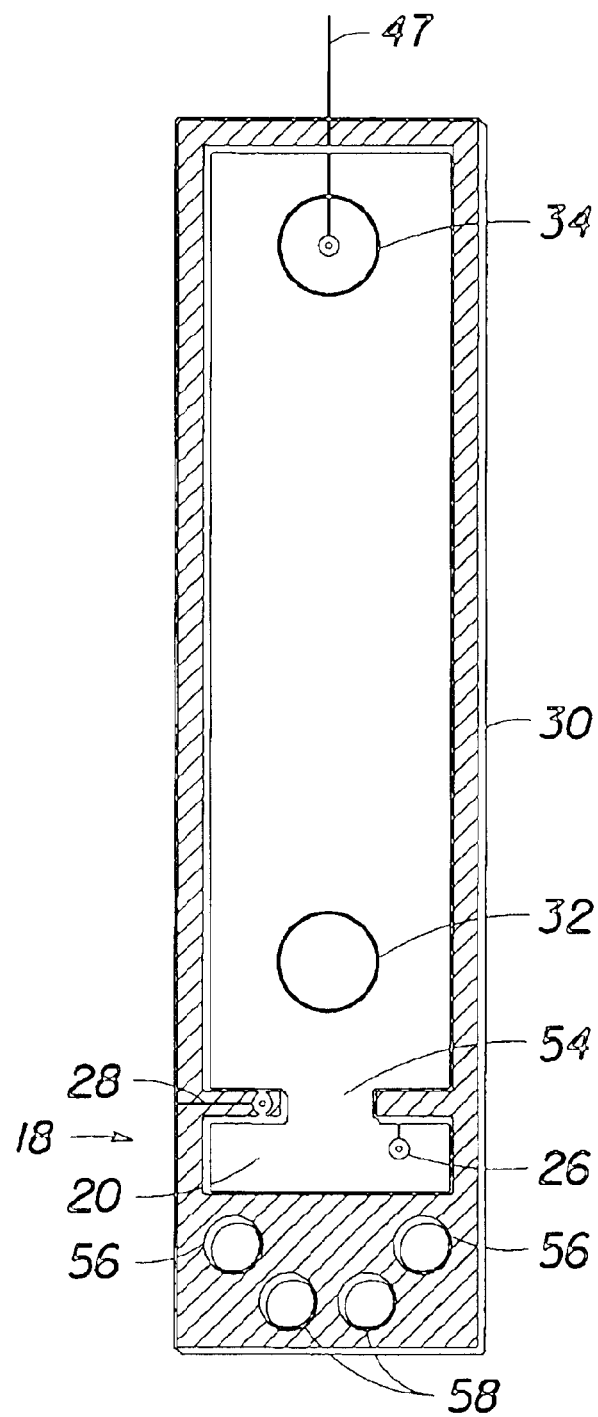
FIG. 3 is a schematic cross-sectional view of the water evaporation chamber and gas humidification chamber of FIG. 1 or 2 showing a preferred placement of the heaters and temperature measuring devices.

FIG. 3 is another cross-sectional view of the evaporator 18 and reactant gas riser 30. The evaporator 18 contains the evaporation chamber 20 and the temperature probe 26. The second temperature probe 28 is placed on the opposite side of the evaporator chamber from the heaters 56,58. Two sets of heaters are shown which may operate as a primary set 56 and a secondary set 58 to provide finer adjustment of the heat being delivered to the evaporator. The figure also shows the unhumidified reactant gas inlet port 32, and exit port 34.

Figure 4:
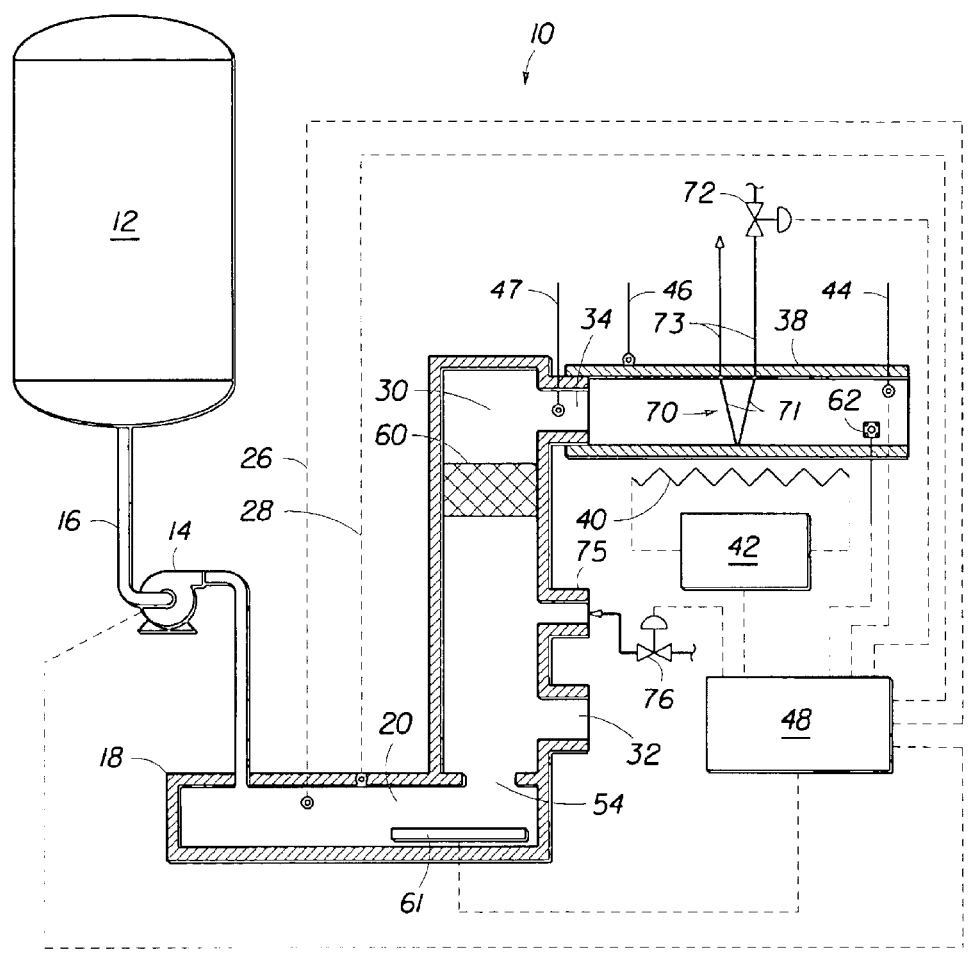
FIG. 4 is a schematic cross-sectional view of one embodiment of a gas humidification apparatus of the present invention using an ultrasonic mister or humidifier.

FIG. 4 presents an embodiment of the present invention using an ultrasonic humidification system. The transducers 61 are immersed in the evaporation chamber 20. The controller 48, also containing the oscillator (not shown) of the ultrasonic mister, increases or decreases the amount of mist generated after comparing the humidification set point with the feedback from the humidistat 62 in the transfer line 38. A demister pad 60 may be used to knock out and coalesce any non-evaporated droplets before the humidified gas stream leaves the humidification chamber 30. These coalesced droplets will drain back into the evaporation chamber 20. In addition to the heater 40 provided on the transfer line, optionally additional heaters may be provided before the gas inlet 32, to heat the gas before the gas enters the humidification chamber 30, before the gas enters the transfer line 38 and/or after the gas enters the transfer line. Furthermore, the heater 40 may be totally replaced by any of these heaters or a combination of these heaters. As another option, piping or tubing may be run from the evaporation chamber to the humidification chamber to inject some or all of the mist directly into the humidification chamber, preferably into the center of and in the same direction as the gas flow, at one or more than one location in the humidification chamber. An additional option may be to control a water level in the bottom of the humidification chamber, below the reactant gas inlet, and immerse the transducers therein, thus removing the need for a separate evaporator chamber. Optionally, a cooler 70 after the gas exit port 34 may be used to control the dew point of the gas. The controller 48 may adjust the cooling fluid flow by manipulating a control valve 72, thereby controlling the gas dew point. Cooling fluid, such as water, may be supplied to and from the cooler through pipes 73. The gas is cooled as the gas flows over the tubes 71 containing the cooling fluid. Furthermore, as another option, steam from an outside source may be injected through a port 75 directly into the humidification chamber. The controller 48 may control the gas humidity by adjusting the steam injection rate with control valve 76.

EXAMPLE

An apparatus having two independent humidification subsystems or humidifiers was fabricated and tested. When testing a fuel cell, one humidifier was used for the reactant fuel gas and the other humidifier was used for the reactant oxidizer gas. The apparatus used an internal liquid water storage reservoir with a low level float switch allowing an embedded controller to monitor the water level. Optionally, the reservoir may be directly connected to a supply of water of suitable quality (deionized or distilled) and the reservoir water level maintained automatically by a mechanical float valve or the reservoir can be removed and manually filled with water. However, each humidifier had a metering pump (model RHB0CKC from FMI (Fluid Metering Incorporated) of Syosset, N.Y.) for delivering controlled amounts of water to the evaporation chamber. The pumps were individually controlled by the embedded computer to deliver a user-defined amount of liquid water to the evaporator, specifically from zero to 25 milliliters per minute. Alternatively, stepper motors such as, FMI model STH00CKCLF, could be used to provide even tighter control of the liquid water transfer rate.

Each evaporator was fitted with multiple cartridge type heaters, each heater provided approximately 600 Watts of heat directly to the bottom portion of the evaporator. The evaporator used for humidification of the fuel gas stream was fitted with two heating cartridges while the evaporator for humidifying the oxidant gas stream was fitted with four cartridges to provide approximately twice the evaporation capacity. The cartridge heaters were placed directly beneath and in close proximity to the evaporation chambers. A temperature probe was fitted in the top of the evaporator body and was used to monitor the bulk temperature of the evaporator for heater control and to detect a flooded evaporator condition. A threaded inlet was provided at the end of the evaporator opposite the gas riser for the introduction of liquid water.

The evaporator was directly welded under a vertical gas riser having a height of 14 inches, a dry reactant gas inlet port near the bottom, and a humidified reactant gas discharge port near the top. The inside of the lower half of the gas riser was fitted with perforated stainless steel baffles that had been corrugated and pressed inside the riser such that the edges and bends of the corrugates contacted each wall. Each reactant gas riser was also fitted with a high cracking pressure (100 psi) check valve placed in the forward direction from the gas riser. The check valves operated as a pressure relief system to safely direct steam and reactant gas to a proper vent if needed.

The apparatus included thermocouple inputs and power outputs for each independently controlled, heated humidified reactant gas transfer line. The duty cycle of the power to these electrically heated transfer lines was varied to maintain the desired set point temperature.

The apparatus contained a commercially available industrial control system (such as the MicroDAC series of controller available from Grayhill of LaGrange Ill.) and individual I/O modules for control and monitoring of the apparatus. This embedded control system utilizes software that was specifically written for this application. This software provided a graphical user interface, standalone operation, safety and performance monitoring, flooded evaporator detection and correction, and exit humidified reactant gas transfer line temperature control. The software was also designed to operate with other fuel cell test equipment so that critical parameters could be passed between the units for increased functionality and safety as well as control of the apparatus and data collection.

The invention also lends itself to other applications requiring the accurate and real-time control of the humidification of a gas stream. One example is a humidified gas stream used for dew point determination.

While the foregoing is directed to the preferred embodiment of the present invention, other and further embodiments of the invention may be devised without departing from the basic scope thereof, and the scope thereof is determined by the claims that follow.

What is claimed is:

1. A method for humidifying a reactant gas stream for use in a fuel cell comprising:

passing the reactant gas stream through a humidification chamber;

providing liquid water into an evaporator chamber at a mass flow rate to produce water vapor at a mass flow rate in relation to the liquid water mass flow rate;

communicating the water vapor from the evaporator chamber into the humidification chamber for humidifying the reactant gas stream;

monitoring one or more parameters of the fuel cell operation; and changing the flow rate of the liquid water to maintain a setpoint value for the one or more parameters, wherein the one or more parameters are selected from the group consisting of humidified reactant gas dew point temperature, humidified reactant gas pressure, applied load, fuel cell voltage, fuel cell stack voltage, the extent of membrane hydration and combinations thereof.

2. The method of claim 1, further comprising:

monitoring the performance of the fuel cell while changing the flow rate of the water in proportion to the flow rate of the reactant gas stream.

3. The method of claim 1, further comprising:

monitoring the temperature of the water vapor, and maintaining the temperature of the water vapor at a set point temperature.

4. The method of claim 1, further comprising:

monitoring the performance of the fuel cell while changing the set point temperature of the humidified reactant gas stream.

5. The method of claim 1, further comprising:

monitoring the evaporation rate of the water in the evaporation chamber; and adjusting the amount of water provided to the evaporation chamber based on the evaporation.

6. The method of claim 1, wherein the reactant gas stream is passed through the humidification chamber at a flow rate required to operate the fuel cell.

7. The method of claim 1, wherein the water vapor is communicated from the evaporator chamber into the humidification chamber through an orifice.

8. The method of claim 1, wherein the mass flow rate of the water vapor is in relation to the flow rate of the reactant gas stream.

9. The method of claim 1, further comprising monitoring the performance of the fuel cell while changing the flow rate of the water vapor.

10. The method of claim 1, further comprising transferring heat between the reactant gas stream and the water vapor.

11. The method of claim 1, further comprising superheating the water vapor.

12. The method of claim 1, further comprising condensing water vapor from the reactant gas stream in the humidification chamber.

13. The method of claim 1, further comprising: providing a gas transfer line from the humidification chamber to an outlet for communication with the fuel cell; and maintaining the gas transfer line temperature in relation to the outlet gas temperature.

14. The method of claim 1, further comprising: providing a gas transfer line from the humidification chamber to an outlet for communication with the fuel cell; and maintaining the gas transfer line temperature in relation to the outlet gas dewpoint temperature.

15. The method of claim 1, further comprising: providing a gas transfer line from the humidification chamber to an outlet for communication with the fuel cell; and heating the gas transfer line to prevent condensation of water vapor.

16. The method of claim 1, further comprising monitoring the temperature of the humidified gas stream; and maintaining the temperature of humidified gas stream at a set-point temperature.

* * * * *